(12) United States Patent
Brennan et al.

(10) Patent No.: US 12,141,915 B2
(45) Date of Patent: Nov. 12, 2024

(54) LOAD INSTRUCTION FOR MULTI SAMPLE ANTI-ALIASING

(71) Applicant: Advanced Micro Devices, Inc., Santa Clara, CA (US)

(72) Inventors: Christopher J. Brennan, Boxborough, MA (US); Fataneh F. Ghodrat, Boxborough, MA (US); Tien E. Wei, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/028,811

(22) Filed: Sep. 22, 2020

(65) Prior Publication Data

US 2021/0407182 A1    Dec. 30, 2021

Related U.S. Application Data

(60) Provisional application No. 63/044,703, filed on Jun. 26, 2020.

(51) Int. Cl.
*G06T 1/20* (2006.01)
*G06T 15/00* (2011.01)
*G06T 15/50* (2011.01)

(52) U.S. Cl.
CPC ............. *G06T 15/503* (2013.01); *G06T 1/20* (2013.01); *G06T 15/005* (2013.01)

(58) Field of Classification Search
CPC .. G09G 5/28; G06T 1/20; G06T 3/403; G06T 11/203; G06T 11/40; G06T 15/005; G06T 15/503; G06T 2200/12
USPC .................................... 345/501, 503, 611
See application file for complete search history.

(56) References Cited

U.S. PATENT DOCUMENTS

| | | | |
|---|---|---|---|
| 9,207,936 B2 | 12/2015 | Kim et al. | |
| 10,223,809 B2 | 3/2019 | Seiler | |
| 2014/0327696 A1* | 11/2014 | Pomianowski | G06T 11/40 345/611 |
| 2014/0347385 A1* | 11/2014 | Akenine-Moller | G06T 9/00 345/611 |
| 2015/0054836 A1* | 2/2015 | Bolz | G06T 15/005 345/505 |
| 2015/0091918 A1 | 4/2015 | Kim et al. | |
| 2017/0287209 A1* | 10/2017 | Gierach | G06T 15/005 |
| 2018/0182058 A1 | 6/2018 | Potter et al. | |
| 2018/0308211 A1 | 10/2018 | Surti et al. | |
| 2019/0392631 A1 | 12/2019 | Strugar | |
| 2020/0210187 A1* | 7/2020 | Alexander | G06F 9/3851 |

FOREIGN PATENT DOCUMENTS

WO    2018/118363 A1    6/2018

* cited by examiner

*Primary Examiner* — Jacinta M Crawford
(74) *Attorney, Agent, or Firm* — Volpe Koenig (57) ABSTRACT

Techniques for performing multi-sample anti-aliasing operations are provided. The techniques include detecting an instruction for a multi-sample anti-aliasing load operation; determining a sampling rate of source data for the load operation, data storage format of the source data, and loading mode indicating whether the load operation requests same or different color components, or depth data; and based on the determined sampling rate, data storage format, and loading mode, load data from a multi-sample source into a register.

23 Claims, 7 Drawing Sheets

LOAD INSTRUCTION FOR MULTI SAMPLE ANTI-ALIASING

CROSS-REFERENCE TO RELATED APPLICATIONS

This application claims the benefit of U.S. Provisional application No. 63/044,703, entitled "LOAD INSTRUCTION FOR MULTI SAMPLE ANTI-ALIASING," filed on Jun. 26, 2020, the entirety of which is hereby incorporated herein by reference.

BACKGROUND

Three-dimensional ("3D") graphics processing pipelines perform a series of steps to convert input geometry into a two-dimensional ("2D") image for display on a screen. In multi-sample anti-aliasing, a high resolution image is generated and then "resolved" into a lower resolution image. Improvements to this technology are constantly being made.

BRIEF DESCRIPTION OF THE DRAWINGS

A more detailed understanding can be had from the following description, given by way of example in conjunction with the accompanying drawings wherein.

DETAILED DESCRIPTION

Techniques for performing multi-sample anti-aliasing operations are provided. The techniques include detecting an instruction for a multi-sample anti-aliasing load operation; determining a sampling rate of source data for the load operation, data storage format of the source data, and loading mode indicating whether the load operation requests same or different color components, or depth data; and based on the determined sampling rate, data storage format, and loading mode, load data from a multi-sample source into a register.

Figure 1:
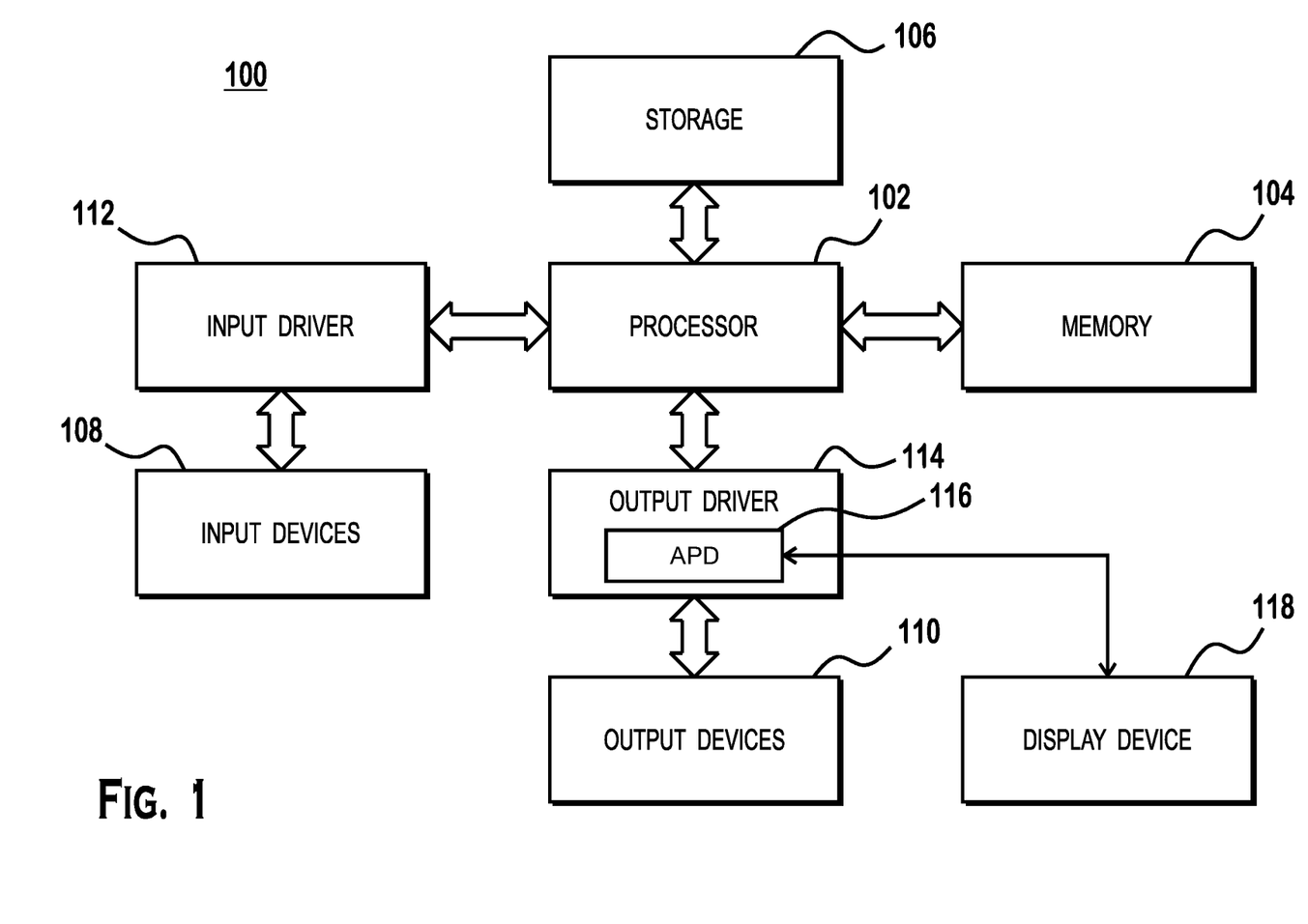
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
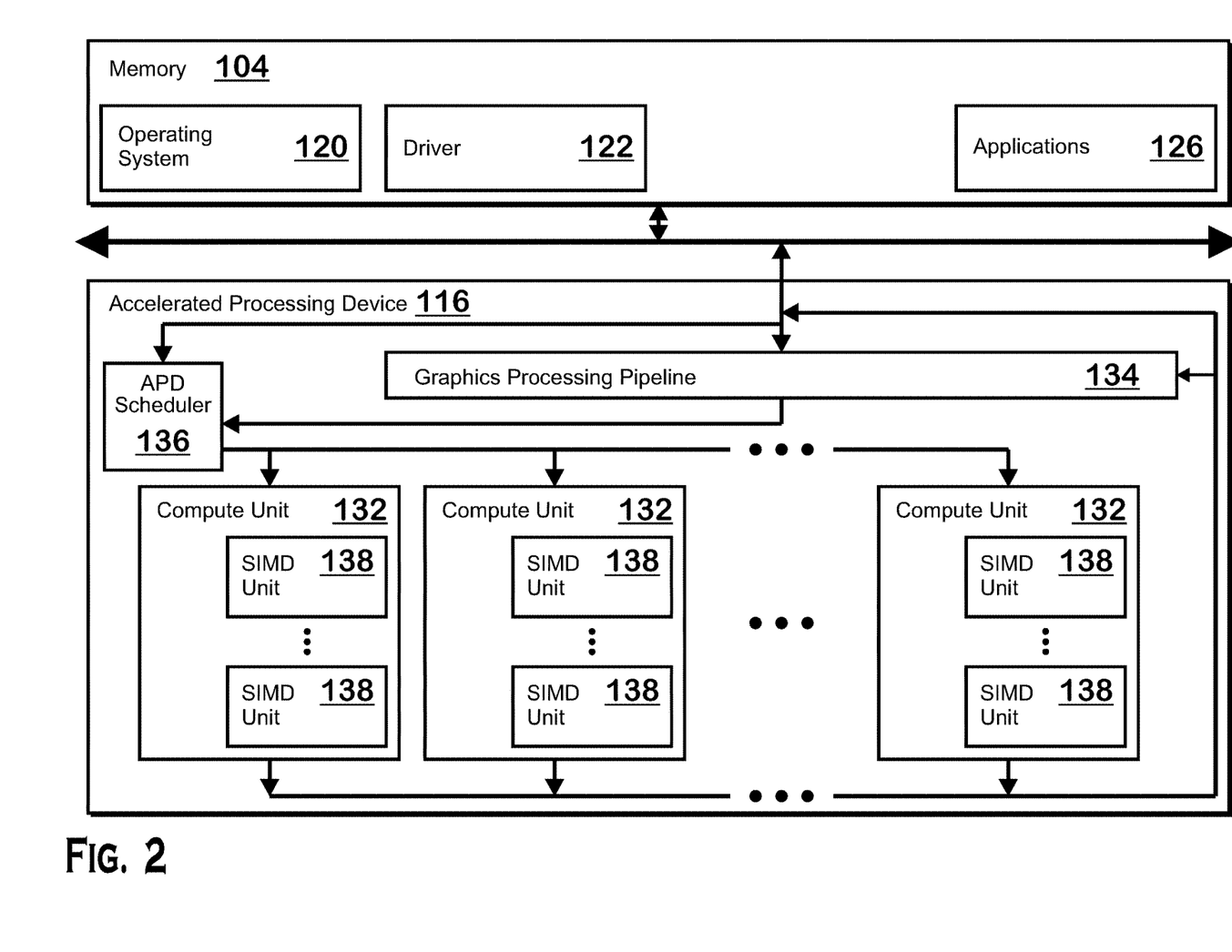
FIG. 2 illustrates details of the device of FIG. 1, according to an example.

FIG. 2 illustrates details of the device 100 and the APD 116, according to an example. The processor 102 (FIG. 1)

executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102. In some examples, these compute processing operations are performed by executing compute shaders on the SIMD units 138.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
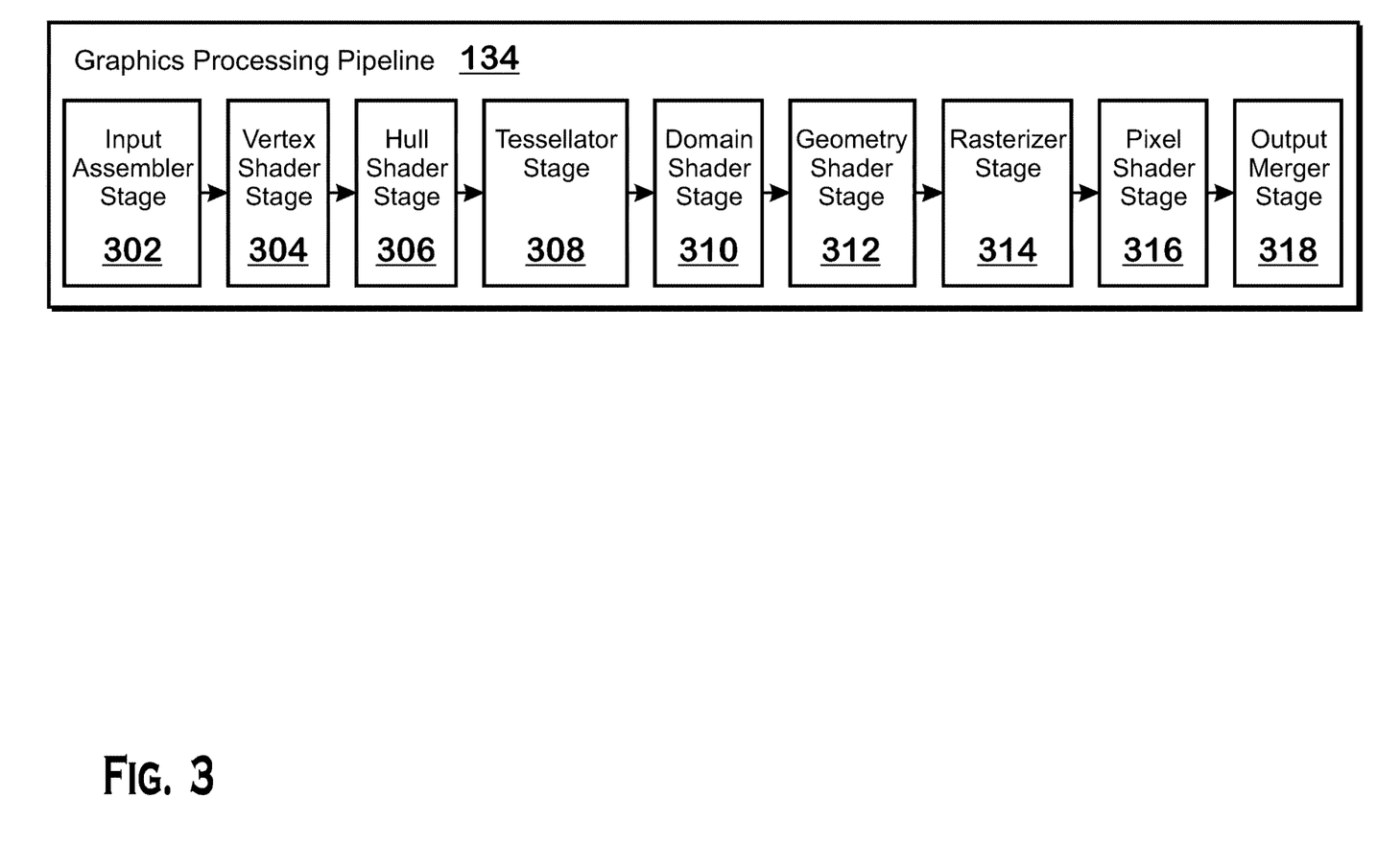
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132 that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a target surface, performing operations such as z-testing and alpha blending to determine the final color for the screen pixels. A target surface is the eventual target for a frame of the rendering operations within the graphics processing pipeline 134. The target surface may be at any location in memory (such as within a memory of the APD 116, or in memory 104).

The rasterizer stage 314 accepts triangles from earlier stages and performs scan conversion on the triangles to generate fragments. The fragments are data for individual pixels of a render target and include information such as location, depth, and coverage data, and later, after the pixel shader stage, shading data such as colors. The render target is the destination image to which rendering is occurring (i.e., colors or other values are being written). If the render target is a multi-sample image, then each pixel has multiple sample locations. The fragments that are generated by the rasterizer stage 314 are transmitted to the pixel shader stage 316, which determines color values for those fragments, and may determine other values as well.

Figure 4:
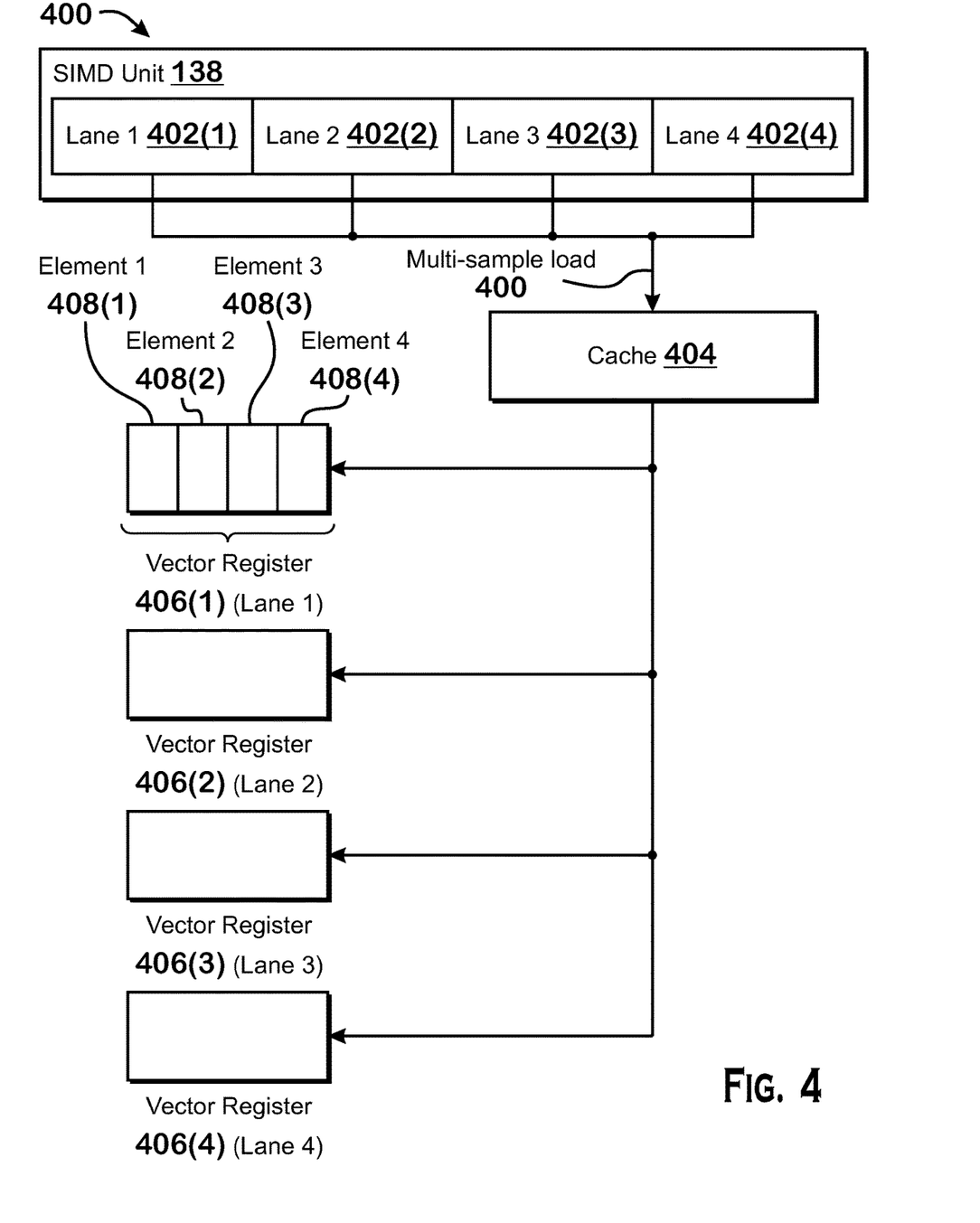
FIG. 4 illustrates a multi sample anti-aliasing load operation 400, according to an example.

FIG. 4 illustrates a multi sample anti-aliasing load operation 400, according to an example. Anti-aliasing is a technique whereby data is generated for each of multiple samples of each pixel of a multi-sample render target. A multi-sample resolve operation, which can be performed in any manner (such as by software, hardware circuitry, or a combination thereof), but in some implementations is performed by a shader program executing on the compute units 132, down-samples the information of the multi-sample render target to generate a full-resolution image. In an example where the multi-sample rate is 4×, the graphics processing pipeline 134 generates a multi-sample image having four samples per pixel. Then, a multi-sample resolve operation down-samples the multi-sample image to generate a full-resolution image. The number of samples for each pixel of the full-resolution image is one quarter of the number of samples of the multi-sample render target. The term "sample" includes one or more of color information (including one or more color components), depth information, and/or other information. In some examples, a sample in a multi-sample image has four color components and one depth component.

As described elsewhere, the compute units 132 include SIMD units 138 that perform operations in a single-instruction-multiple-data manner. More specifically, each active lane 402 executes the same instruction as all other lanes 402 in the SIMD unit 138 in any given clock cycle. Thus, when the SIMD unit 138 executes the multi-sample load operation, each active lane 402 of the SIMD unit 138 performs that load operation.

For any particular lane 402, the load operation involves fetching multiple elements 408 for one or more samples from a cache 404 into a vector register per lane 402. A number of different versions of the multi-sample load operation are disclosed herein. In general, these different versions vary based on what data is requested. In some examples, a single load operation for a single lane 402 loads the same color component (e.g., "R" for an "RGB" color scheme) for different samples into a single vector register 406 for the lane 402. In other examples, a single load operation for a single lane 402 loads multiple (such as all) color components for a single sample into a vector register 406 for that lane 402. In yet other examples, a single load operation for a single lane 402 loads one depth value for multiple samples into a vector register 406 for that lane 402. In any case, the elements 408 refer to individual data elements (such as color components or depth values) loaded by the load operation.

The illustrated cache 404 is a cache in a memory hierarchy from which the SIMD unit 138 fetches data into registers such as the vector register 406. In various examples, the cache 404 is within the SIMD unit 138, within a compute unit 132 but outside of a SIMD unit 138, or within the APD 116 but outside of a compute unit 132. It should be understood that a miss in the cache 404 would result in the cache performing a cache line fill from higher up in the memory hierarchy.

To summary, the multi sample anti-alias load is an instruction that is executed by each active lane 402 of a SIMD unit 138. The instruction is performed at the request of a shader program executed on a SIMD unit 138. For any particular lane 402, the instruction specifies which elements of a multi-sample surface are loaded into a vector register 406 associated with that lane 402. In some examples, the elements loaded for one lane 402 are the same color component from different samples in the same pixel. In other examples, the elements are different color components from the same sample in a pixel. In other examples, the elements are depth values for different samples within the same pixel. A load instruction includes an indication of whether color components or depth components are loaded, as well as whether the same color component or different color components are loaded. Based on the sampling rate of the surface, and the organization of the stored data, the SIMD unit 138 selects a stride and loads the elements requested into a vector register 406 based on that stride.

In the situation that the load operation is to load the same component of different samples of a pixel, the number of samples of each pixel is, in some situations, different than the number of elements actually loaded by a particular load operation, where the number of elements loaded is, in some instances, determined by the size of the vector register 406 destination in comparison to the size of the color components. (For example, if the size of a vector register 406 is the same as the size of four elements, then a load operation loads for elements). In situations where the number of samples is lower than the number of elements to be loaded, the load operation loads the same component for different samples into a portion of the vector register 406. The load operation handles the remaining portion of the vector register 406 in any technically feasible manner, such as by repeating elements actually loaded into that portion, storing a constant into that portion, or placing any other value into that portion of the vector register 406. In situations where the sampling rate is greater than the number of elements to be loaded, the load operation operations in two or more phases. In each phase, the same component for a different set of samples (e.g., samples 1-4, samples 5-8, etc.) is loaded. In some implementations, the load instruction includes a flag that indicates the phase (thus allowing a programmer or other author of a program (which is in some instances a shader program) to specify which sets of samples are loaded at any particular time. In other implementations, a single load instruction specifies two or more vector registers 406 and the SIMD unit 138 fetches the same color component for different sets of samples the data to those two or more vector registers 406. This "phasing" also applies to depth buffer loads for sampling rates higher than the vector register size, as illustrated, for example, in FIG. 5C.

The load operation 400 is illustrated in the context of the SIMD unit 138 and in the context of SIMD processing, but operation of the load instruction outside of a SIMD context is contemplated in this disclosure as well.

Figure 5A:
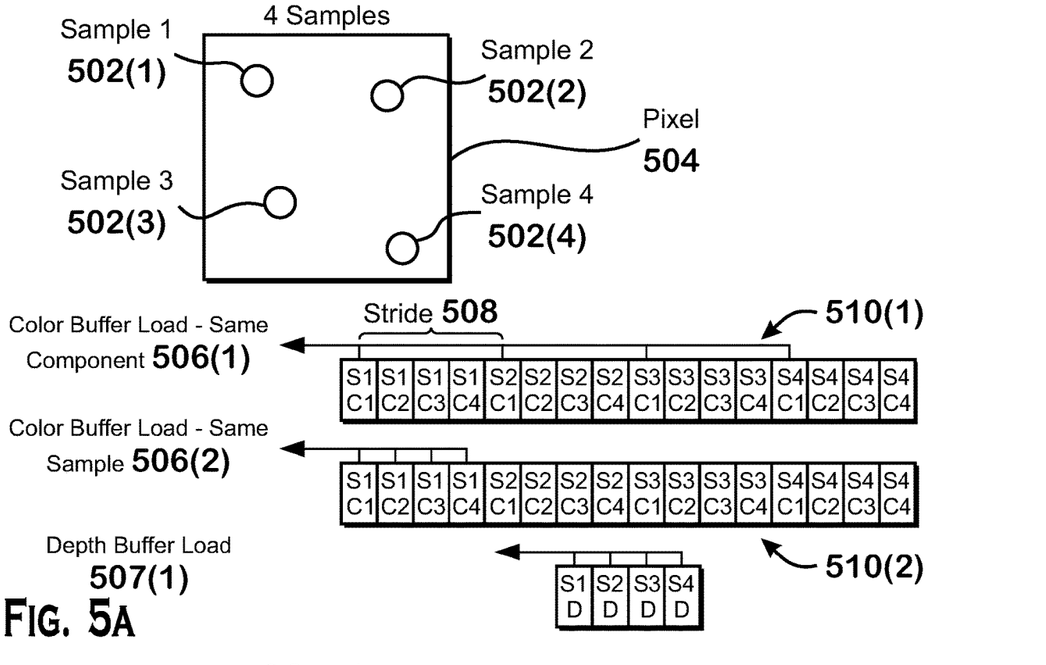
FIGS. 5A-5C illustrate example variations for the multi-sample load instruction.
Figure 5B:
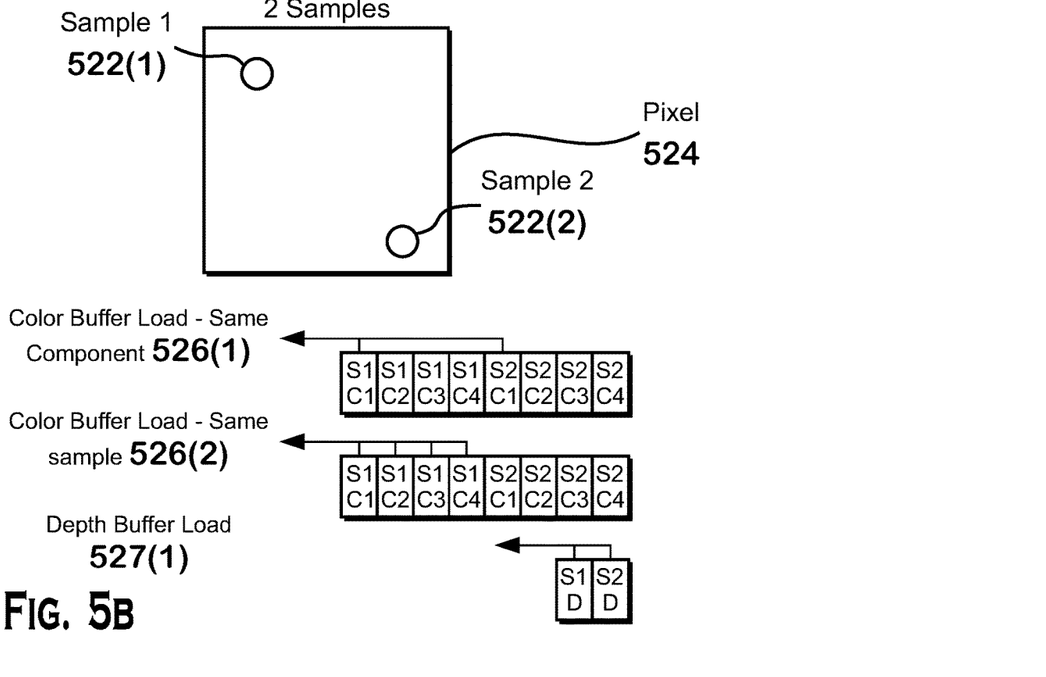
Figure 5C:
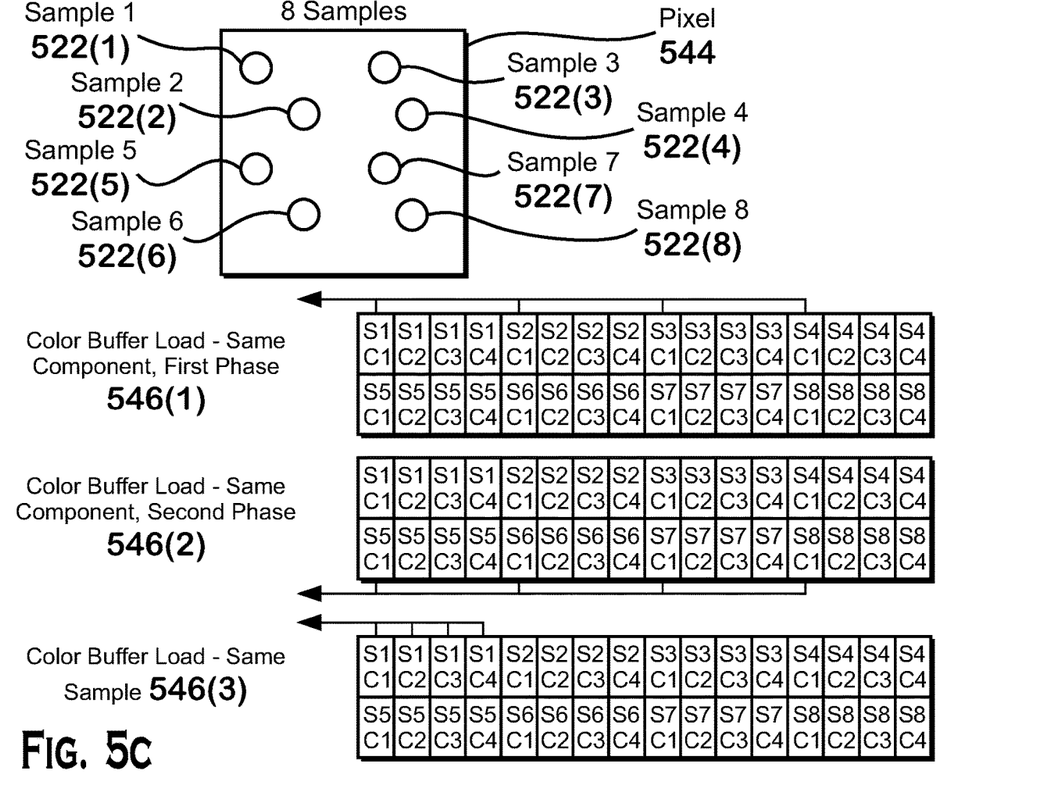

FIGS. 5A-5C illustrate example variations for the multi-sample load instruction. Each of the operations illustrated in FIGS. 5A-5C assume a data format for the color buffer (the source from which the color components are loaded) where the color components for each individual sample are stored together, in one continuous chunk.

FIG. 5A illustrates examples involving a multi-sample render target having 4 samples 502 per pixel 504. In a first example load operation—the color buffer load—same component operation 506(1), the SIMD unit 138 loads elements of the same color component for the pixel 504. As described above, based on the sample rate of the data from which the load is fetching elements, and on whether the load operation is for the same component or the same sample, the SIMD unit 138 selects a stride 508. The stride indicates 508 the number of elements in a cache data set 510 that are advanced over when obtaining the elements for the load operation. In FIG. 5A, the number is 4. This is because in the cache data set 510(1) illustrated, the color data is arranged such that color components for the same pixel are in consecutive memory positions. Note that the color components are indicated with the notation SXCY, where X is the sample number and Y is the component number. The stride 508 of 4 allows the load operation 506(1) to collect each of the same component for four different samples.

In a second example, color buffer load—same sample 506(2), the load has a stride of 1 due to the components for each sample being consecutive. This allows the load to obtain all components of a single sample 502 where, again, the color data is arranged as shown.

In a third example, depth buffer load 507(1), the stride is 1, because the depth data has only one component. Thus the depth buffer load 507(1) loads depth data for 4 different samples with a single instruction.

FIG. 5B illustrates a different example mode of operation, where each pixel 524 has two samples 522 instead of 4 (i.e., the sampling rate is 2×). In this mode of operation, color buffer load operation—same component 526(1) has a stride of 4, since this operation obtains the same color component from different samples, and the format of the data being loaded is such that different color components of the same sample are consecutive in memory. However, because there are only two samples in a pixel, the load operation 526(1) obtains only two color components and not four. When writing data into the vector register 406, in various implementations, the load operation 526(1) repeats the two components of data, fills two elements of the vector register 406 with 0's or another constant, or places any other data into those two elements.

Color buffer load—same sample 526(2) loads consecutive data items. In the example shown, these consecutive data items are the four color components for a single sample 522. Depth buffer load operation 527(1) loads consecutive depth values, one for each sample, as illustrated.

FIG. 5C illustrates another example, where each pixel has 8 samples 522. In this example, a color buffer load operation that loads the same number of elements into the same size vector register 406 as with the 4 sample and 2 sample examples is not able to load all of the same component for every sample in a pixel into such a vector register 406. Thus the load operation operates in two different phases. In the first phase, shown as color buffer load—same component, first phase 546(1), the load operation 546(1) loads the same color component for a first four samples 522. In the second phase, shown as color buffer load same component, second phase 546(2), the load operation 546(2) loads the same color component for a second set of different samples. In the example illustrated, load operation 546(1) loads color component C1 for samples S1-S4 and load operation 546(2) loads color component C1 for samples S5-S8. Load operation 546(1) and load operation 546(2) each have a stride of 4, reflecting that four components are skipped over for each element obtained by the load operation 546, so that the same component for each sample is loaded.

For color buffer load—same sample 546(3), the load operation 546(3) loads with stride 1, meaning consecutive color components are loaded, as illustrated.

For the depth buffer load, two phases are illustrated. In one mode, depth buffer load, first phase 547(1), the load instruction 547(1) loads a depth component for a first set of samples, with stride 1. In another mode, depth buffer load, second phase 547(2), the load instruction 547(2) loads a depth component for a second set of samples, with stride 1. In the examples, the first set of samples are samples S1-S4 and the second set of samples are samples S5-S8.

Figure 5D:
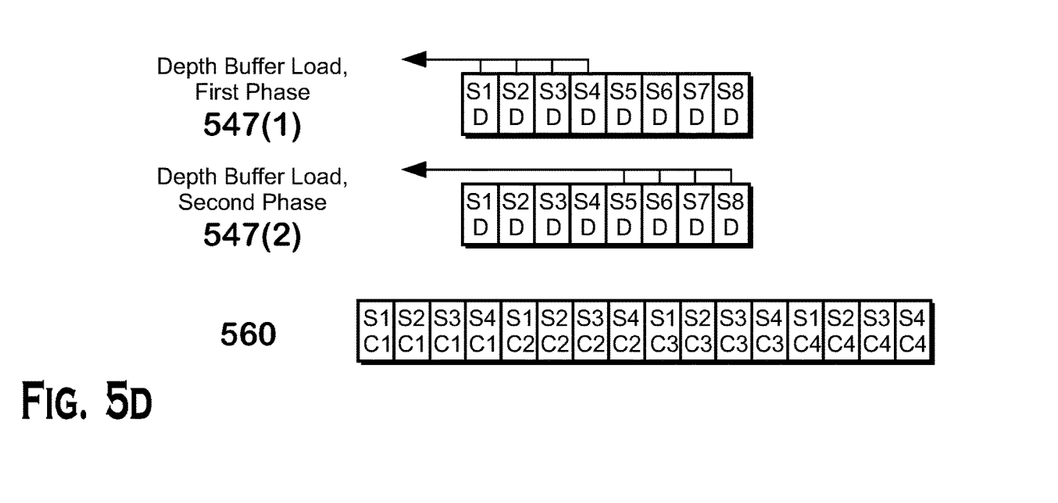
FIG. 5D illustrates a different data layout than that shown in FIGS. 5A-5C.

FIG. 5D illustrates a different data layout 560 than that shown in FIGS. 5A-5C. Instead of the data set being arranged such that all color components of a single sample are consecutive, in FIG. 5D, the same color component for different samples are consecutive. It should be understood that the example of FIG. 5D is for a 4 sample render target and that other sampling rates are of course possible.

The ordering of the data in the data set 560 of FIG. 5D illustrates that the versions of the load operations illustrated in FIGS. 5A-5C performs different operations depending on how the data being loaded is organized. In FIG. 5A, with the data as shown in that Figure, load 506(1), which operates with stride 4, loads the same color component of different samples. However, if the color load 506(1) were to operate with the data as shown in FIG. 5D, then the load 506(1) would instead fetch four color components of a single sample (thus having stride 1). Similarly, load 506(2), which operates with stride 1, would fetch the same component of a single sample when operated on for the data of FIG. 5D, thus having stride 4.

Note that the various numbers of items (e.g., color components, samples per pixel, vector register size, and the like) illustrated in FIGS. 5A-5D are exemplary in nature, and that variations in one or more of these numbers are contemplated by the present disclosure. For example, in some variations, the number of components for sample colors is different than four. In some variations, the number of elements (components or depth values) that can fit into a vector register 406 is different than four. In some variations, sample rates other than 2×, 4×, or 8× are possible. Many other variations are possible. In some examples, the stride is other than four. For example, where there are five components per color and the components for each sample are consecutive in memory, a load of the same color component for different samples has a stride of five. In some examples, the stride in such a situation is equal to the number of components per color. In other examples where the load operation loads non-consecutive elements, the stride is set to match the spacing of those non-consecutive elements.

Note that the load operations described, in some situations, gain cache efficiency as compared with operations where individual samples or depth values are loaded from the cache one at a time. More specifically, it is possible for a cache line to be evicted in between load operations. Thus with more data being loaded at the same time, fewer cache evictions will occur as data is being loaded.

Figure 6:
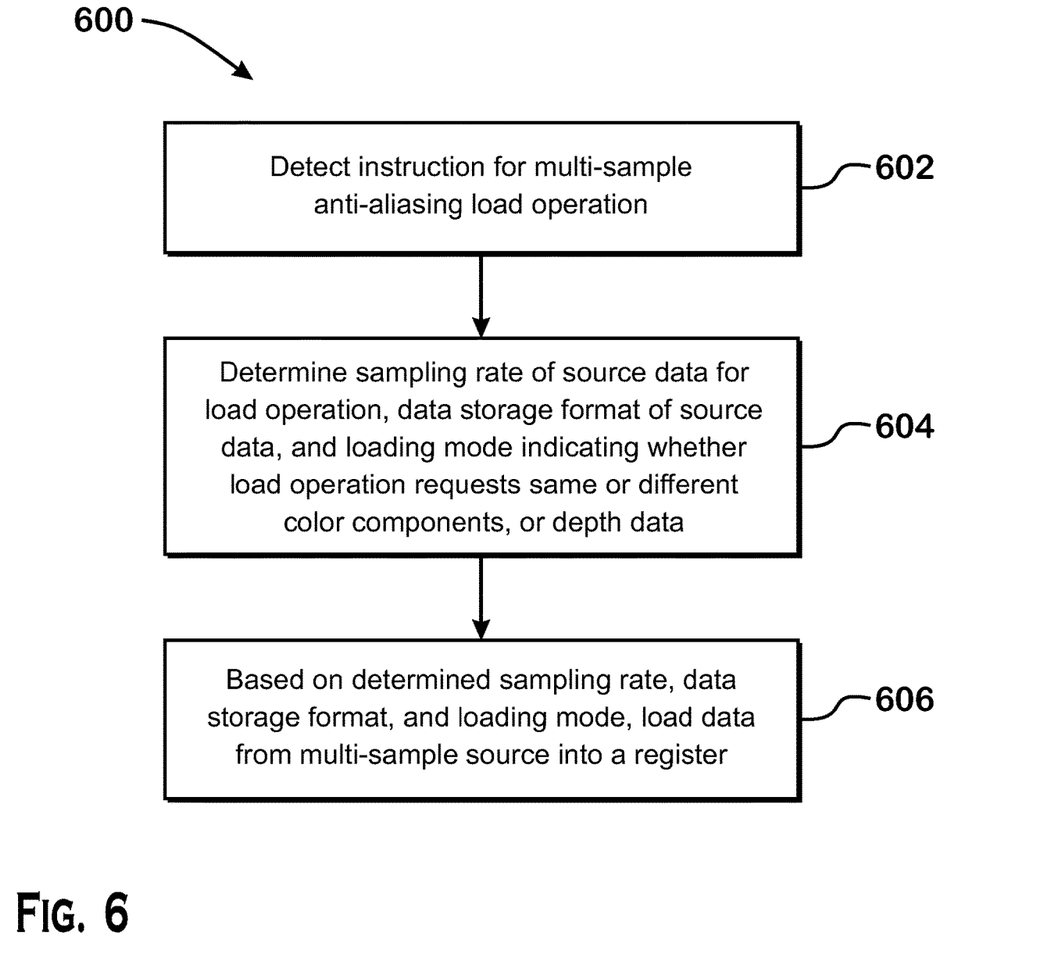
FIG. 6 is a flow diagram of a method 600 for performing multi-sample anti-aliasing operations, according to an example.

FIG. 6 is a flow diagram of a method 600 for performing multi-sample anti-aliasing operations, according to an example. Although described with respect to FIGS. 1-5D, those of skill in the art will understand that any system, configured to perform the steps of method 600 in any technically feasible order, falls within the scope of the present disclosure.

The method 600 begins at step 602, where a processor such as a SIMD unit 138 detects a multi-sample anti-aliasing load instruction. In various examples, the load instruction is part of an instruction set architecture for a processor such as the SIMD units 138. More specifically, the SIMD units 138 execute shader programs that include instructions, some of which are the multi-sample anti-aliasing load instructions.

The multi-sample load operation specifies which buffer to load from, where the term "buffer" means a portion of memory storing data to be loaded. In some examples, the buffer is a render target storing color data or storing depth data. In some examples, the load operation explicitly specifies whether the data of the buffer is color data or depth data. In other examples, the SIMD unit 138 determines, by examining the buffer itself, or metadata for the buffer, whether the data of the buffer is color data or depth data.

At step 604, the SIMD unit 138 determines the sampling rate of the source data for the load operation, the data storage format of the source data if color data is being loaded, and the loading mode indicating whether the load operation requests the same color components of different samples, different color components of the same sample, or depth data. The sampling rate is the number of samples per pixel. The data storage format indicates whether different color components of the same sample are consecutive or the same component of different samples are consecutive.

At step 606, based on the information determined at step 604 the SIMD unit 138 loads the data requested by the load operation. More specifically, the SIMD unit 138 selects a stride based on that information, obtains the data elements based on the characteristics of the operation determined at step 604, and obtains the elements from memory based on the stride. Technique for performing such a load based on this information are described above with respect to FIGS. 4-5D.

Once loaded, the data is used in any technically feasible manner. In one example, a shader program executing in the SIMD unit 138 performs a resolve operation, generating a lower resolution image from the multi-sample images. In an example, each work-item (which corresponds to a lane 402) of the shader program resolves the four samples loaded by the load operation into a single sample. Although any technique may be used, one example technique involves averaging the values loaded.

Each of the functional units illustrated in the figures represent hardware circuitry configured to perform the operations described herein, software configured to perform the operations described herein, or a combination of software and hardware configured to perform the steps described herein. A non-exclusive list of such units includes the storage 106, the processor 102, the output driver 114, the APD 116, the memory 104, the input driver 112, the input devices 106, the output devices 110, the display device 118, the operating system 120, the driver 122, the applications 126, the APD scheduler 136, the graphics processing pipeline 134, the compute units 132, the SIMD units 138, any of the stages of the graphics processing pipeline 134, the lanes 402 of the SIMD unit 138, the cache 404, and the vector registers 406.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing multi-sample anti-aliasing operations, the method comprising:
   executing a load instruction to load, into a register, a plurality of color components including a same type of color component for each sample of a pixel, each sample having color components of different types, wherein the load instruction loads no color components other than the same type of color component; and performing a resolve operation with the plurality of color components.

2. The method of claim 1, wherein a data storage format for data for the plurality of color components indicates different color components of samples are consecutive.

3. The method of claim 2, wherein:
executing the load instruction includes loading with a stride that is greater than 1.

4. The method of claim 2, wherein:
executing the load instruction includes loading the data from a multi-sample source with a stride of 1.

5. The method of claim 1, wherein the same type of color component of different samples are consecutive.

6. The method of claim 1, wherein the load instruction is executed for each active lane.

7. The method of claim 1, wherein the executing occurs in two or more phases.

8. The method of claim 1, wherein:
a sampling rate of source data from which data for the pixel is loaded is greater than a number of elements that fit into the register; and
loading the data includes loading less than all samples of the pixel into the register.

9. The method of claim 1, wherein:
a sampling rate of source data from which data for the pixel is loaded is less than a number of elements that fit into the register; and
loading the data includes repeating loaded data in the register.

10. The method of claim 1, wherein the load instruction is executed by a lane of a single instruction multiple data processing unit.

11. A system for performing multi-sample anti-aliasing operations, the system comprising:
a register; and
a processor configured to:
execute a load instruction to load, into the register, a plurality of color components including a same type of color component for each sample of a pixel, each sample having color components of different types, wherein the load instruction loads no color components other than the same type of color component; and
perform a resolve operation with the plurality of color components.

12. The system of claim 11, wherein a data storage format for data for the plurality of color components indicates different color components of samples are consecutive.

13. The system of claim 12, wherein:
executing the load instruction includes loading with a stride that is greater than 1.

14. The system of claim 12, wherein:
executing the load instruction includes loading the data from a multi-sample source with a stride of 1.

15. The system of claim 11, wherein the same type of color component of different samples are consecutive.

16. The system of claim 11, wherein the load instruction is executed for each active lane.

17. The system of claim 11, wherein the executing occurs in two or more phases.

18. The system of claim 11, wherein:
a sampling rate of source data from which data for the pixel is loaded is greater than a number of elements that fit into the register; and
loading the data includes loading less than all samples of the pixel into the register.

19. The system of claim 11, wherein:
a sampling rate of source data from which data for the pixel is loaded is less than a number of elements that fit into the register; and
loading the data includes repeating loaded data in the register.

20. The system of claim 11, wherein the load instruction is executed by a lane of a single instruction multiple data processing unit of the processor.

21. An accelerated processing device for performing multi-sample anti-aliasing operations, the accelerated processing device comprising:
a register; and
a single instruction multiple data processing unit configured to:
execute a load instruction to load, into the register, a plurality of color components including a same type of color component for each sample of a pixel, each sample having color components of different types, wherein the load instruction loads no color components other than the same type of color component; and
perform a resolve operation with the plurality of color components.

22. The accelerated processing device of claim 21, wherein:
a data storage format for data indicates different color components of samples are consecutive, or the data storage format indicates the same color component of different samples are consecutive.

23. The accelerated processing device of claim 21, wherein the register is accessible by a single lane of the single instruction multiple data processing unit.

* * * * *